United States Patent [19]
Hopkins et al.

[11] Patent Number: 5,845,473
[45] Date of Patent: Dec. 8, 1998

[54] MATERIAL COLLECTION BAG

[75] Inventors: John William Hopkins; Jeremy Douglas Leasure, both of Charlotte, N.C.

[73] Assignee: Deere & Company, Moline, Ill.

[21] Appl. No.: 871,046

[22] Filed: Jun. 9, 1997

[51] Int. Cl.[6] .................................................. A01D 34/70
[52] U.S. Cl. .......................... 56/202; 56/16.6; 56/DIG. 9
[58] Field of Search ............................. 56/202, 199, 203, 56/228, 16.7, 1, 16.6, DIG. 9

[56] References Cited

U.S. PATENT DOCUMENTS

| | | | |
|---|---|---|---|
| 2,747,356 | 12/1956 | Peterson . | |
| 3,527,037 | 9/1970 | Leader | 56/202 |
| 3,668,846 | 6/1972 | Knight | 35/22 |
| 4,103,478 | 8/1978 | Schaefer | 56/205 |
| 4,126,986 | 11/1978 | Kidd | 56/202 |
| 4,149,362 | 4/1979 | Haffner et al. | 56/202 |
| 4,149,363 | 4/1979 | Woelffer et al. | 56/202 |
| 4,152,884 | 5/1979 | Gandrud et al. | 56/202 |
| 4,258,538 | 3/1981 | Morse | 56/202 |
| 4,306,408 | 12/1981 | Chistopherson et al. | 56/202 |
| 4,399,647 | 8/1983 | Soldavini | 56/202 |
| 4,478,031 | 10/1984 | Wolf | 56/202 |
| 4,522,019 | 6/1985 | Edwards et al. | 56/202 |
| 4,566,257 | 1/1986 | Akrabawi | 56/202 |
| 4,665,684 | 5/1987 | DiPaolo | 56/202 |
| 4,843,805 | 7/1989 | Satoh | 56/202 |

*Primary Examiner*—Terry Lee Melius

[57] ABSTRACT

A bagger with a pair of doors at its opening is provided for a walk-behind lawn mower. The bagger opening is provided with a rectangular metal framework with one door being swingably attached to each spaced-apart vertical leg of the framework. The bagger includes a rear handle for supporting its rear portion from the mower push handle and a front handle integrally formed as part of the framework. The front handle is slidably and removably receivable on a hook secured to the mower discharge chute for quick and easy installation and removal. The dual doors, which swing away from one another, facilitate easy insertion of the bagger opening and doors into or out of a refuse can or bag to permit disposal of clippings.

9 Claims, 6 Drawing Sheets

MATERIAL COLLECTION BAG

FIELD OF THE INVENTION

The present invention relates to walk-behind lawn mowers and more particularly to material collection bags used with such mowers.

DESCRIPTION OF THE RELATED ART

Homeowners frequently collect and bag grass and other clippings generated when they mow their lawns. This practice is adopted to provide a lawn having a more finished and desirable appearance. If the grass clippings are not composted by the homeowner, generally they must be placed in a refuse can or bag for disposal.

Commonly, material collection bags attach to a discharge chute carried at the rear of walk-behind mowers and extend rearwardly behind them. The bags include an opening at their forward portion, which serves to receive clippings from the discharge chute and permit collected clippings to be emptied.

Some bags include a door that covers the bag opening. While such doors usually include a small opening to allow clippings to pass from the chute and into the bag, they are often mounted to swing to an opened position to permit the bag to be emptied. When the operator attempts to empty such a collection bag into a refuse can or paper or plastic refuse bag, the opened door often interferes with the ability to insert the bag into the container and/or with the ability to empty clippings into the container.

SUMMARY OF THE INVENTION

It would therefore be desirable to provide a material collection bag with a door assembly which would enable the bag to receive clippings during the mowing process and contain them in the bag when it is carried from the mower to a discharge area.

It would further be desirable to provide a door assembly that would permit the bag opening and its door to be easily inserted into a refuse can or paper or plastic refuse bag and emptied without having the door interfere with that process.

Toward these ends, there is provided a material collection bag having a door assembly that permits the bag opening and door to be easily inserted into refuse bags or cans and emptied.

The door assembly is mounted to a rigid rectangular framework carried around the perimeter of the bag opening. One door is mounted to each opposite vertical leg of the framework for swinging movement between open and closed positions.

One door is provided with an opening through which clippings can pass from the mower discharge chute. Both doors in the preferred embodiment are composed of composite materials such as plastic.

The bag is provided with front and rear handles, the rear handle being supported by the mower push handle and the front handle being coupled with the rectangular framework. The front handle is further removably receivable on a hook carried on the mower discharge chute to quickly and easily secure the front of the bag to the mower chute With the present invention, a material collection bag assembly is provided which is quickly and easily installed or removed from the mower and one which permits the filled bag to be easily emptied into a refuse bag or can.

DESCRIPTION OF THE PREFERRED EMBODIMENT

Figure 1:
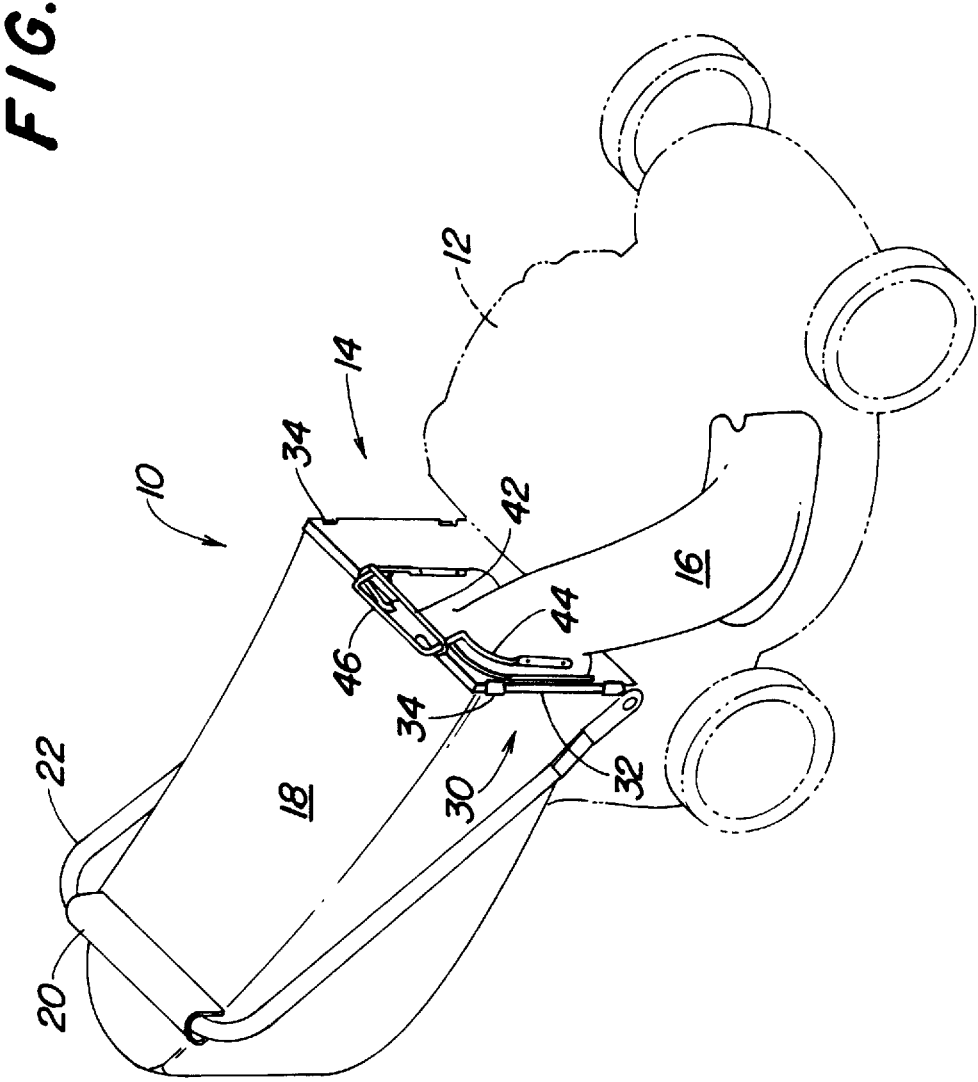
FIG. 1 is a front elevated perspective of the bag and door assembly with the mower and discharge chute illustrated in phantom.

Looking first to FIG. 1, there is shown a material collection bag or bagger 10 carried at the rear of a walk-behind lawn mower 12, the mower 12 being illustrated in phantom. The bagger 10 includes a door assembly 14 which secures it to the discharge chute 16 of the mower 10.

Figure 2:
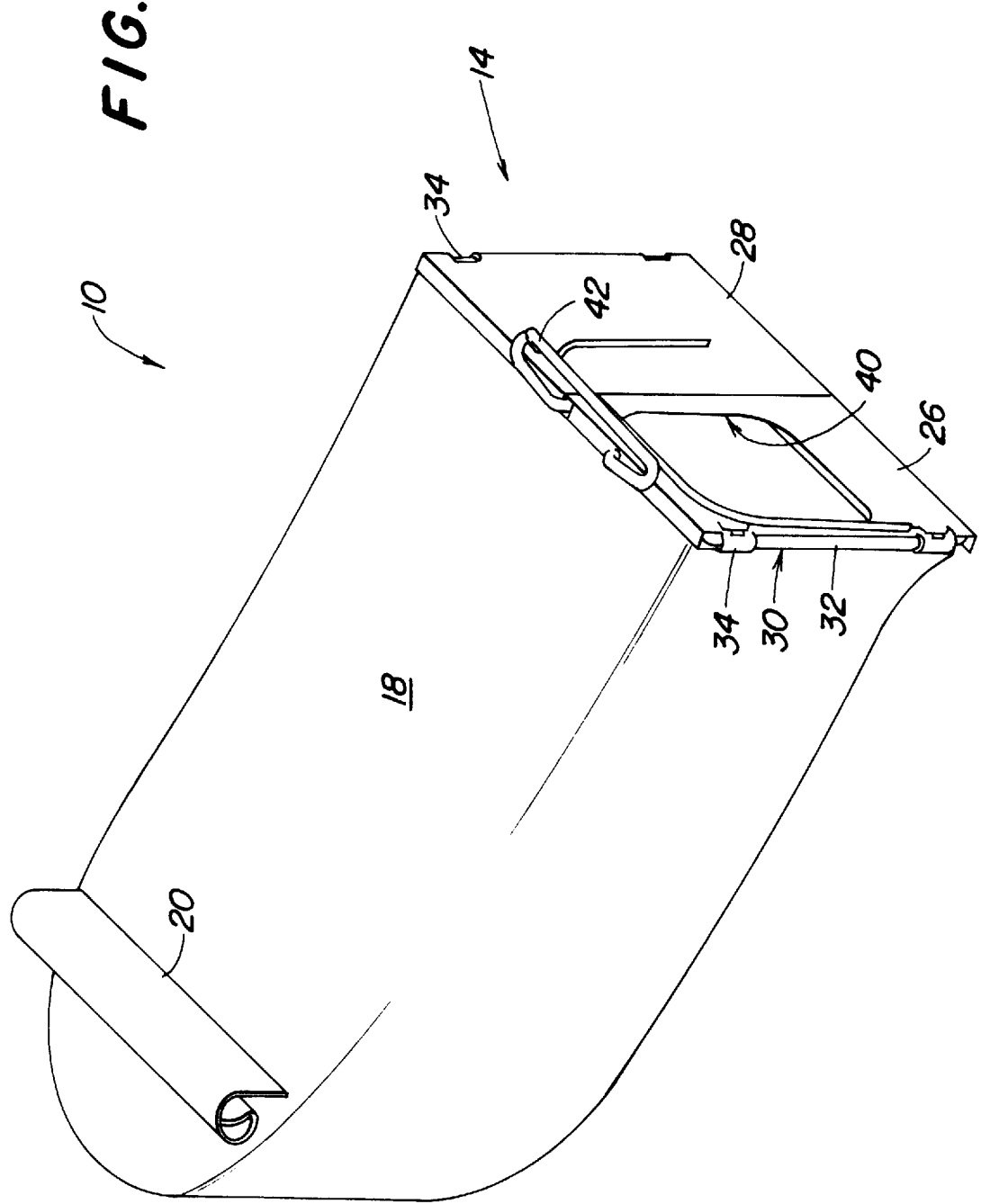
FIG. 2 is an elevated perspective view of the bag and door assembly.
Figure 3:
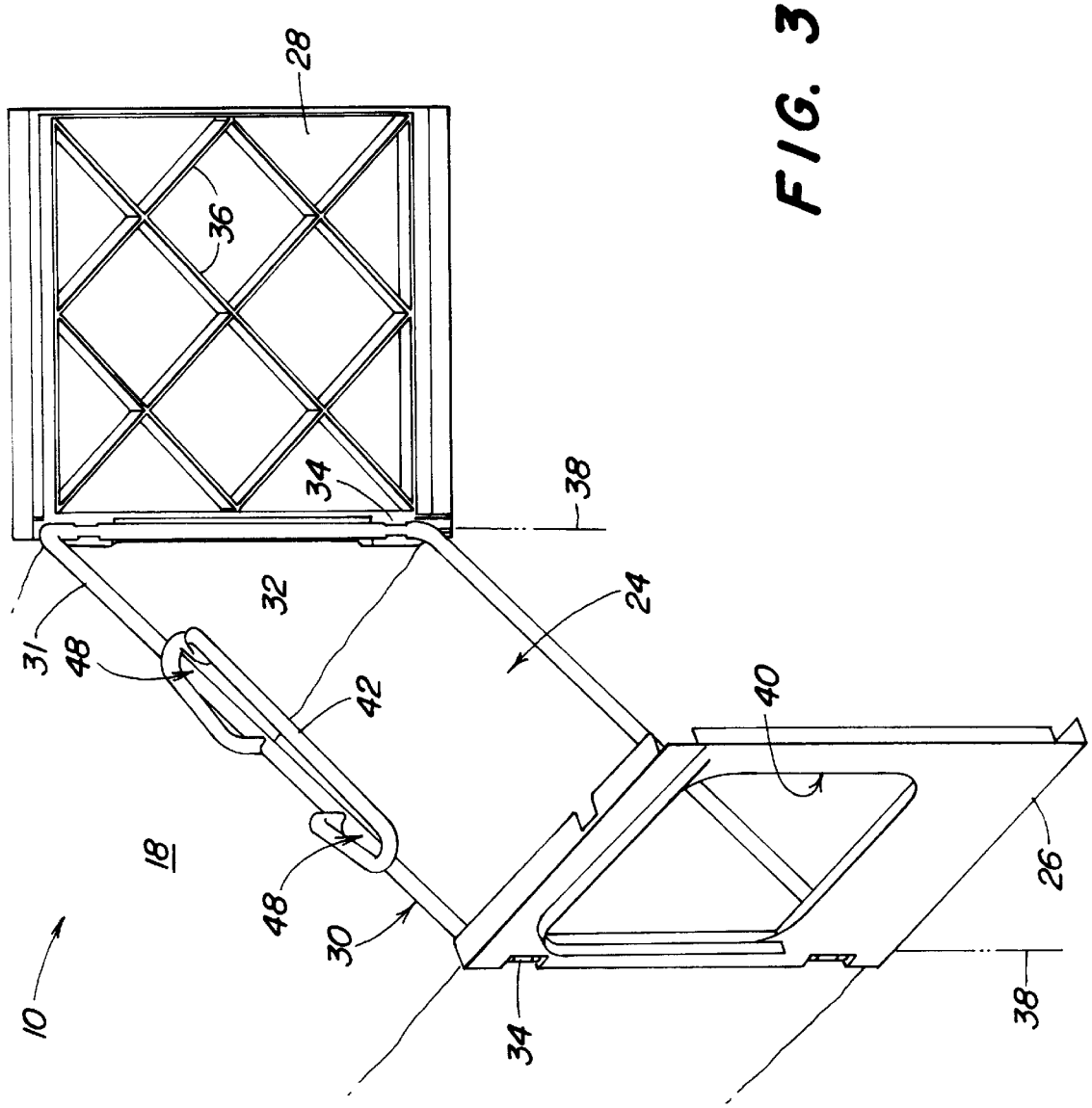
FIG. 3 is an elevated perspective view of door assembly.

Looking also to the enlarged views found in FIGS. 2 and 3, it can be seen that the bagger 10 includes a clippings container 18, which in the preferred embodiment is made of a soft material such as cloth. At the rearward portion of the bagger 10, there is secured a handle 20 for supporting the rear of the bag 10 on the mower push handle 22. At its forward portion, the bagger 10 includes an opening 24 wherein a door assembly 14 is mounted. As best seen in FIG. 3, the door assembly 14 includes two separate doors 26 and 28 which are carried on a rod like framework 30 which in is turn secured to the cloth container 18 at its opening. The framework 30 takes the form of a rectangle and includes a cross member 31, to which laterally spaced-apart and generally vertically extending side members or legs 32 are operatively connected. To each of the legs 32 is attached one of the doors 26 and 28, see FIGS. 3 and 4. These doors 26 and 28 are, in the preferable embodiment, made of a composite material such as plastic and include portions 34 which can be slidably positioned on the vertical legs 32 and snapped into place to hold them to the respective legs 32. Reinforcing ribs 36 have been provided in the preferred embodiment.

Figure 4:
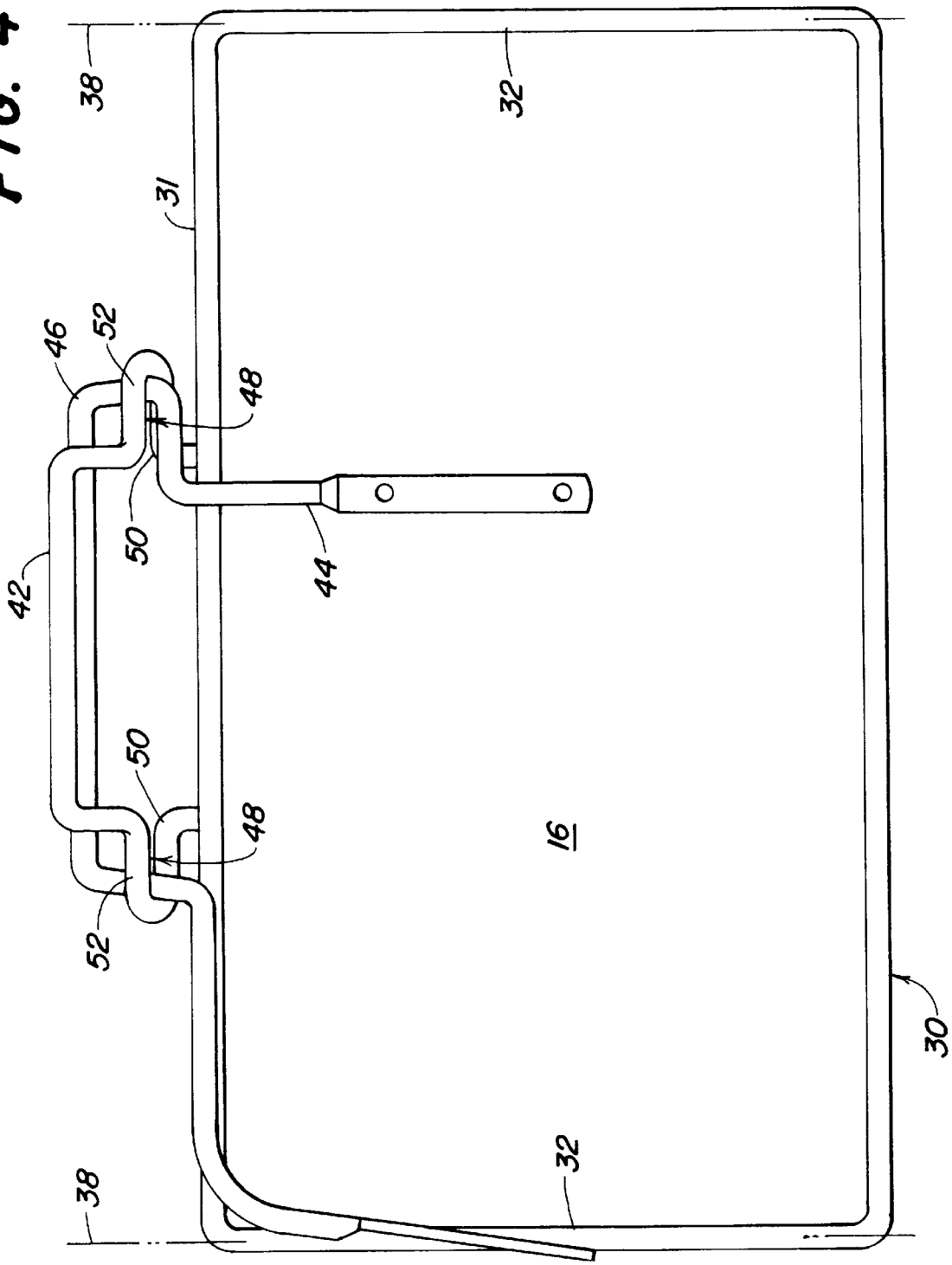
FIG. 4 is a front view of the framework and discharge chute hook.

As is also shown in FIG. 4, the doors 26 and 28 are mounted for swingable movement about vertical axis 38 extending through the laterally spaced-apart vertical legs 32 to permit them to open as shown in FIG. 3 or be moved to their closed position as illustrated in FIG. 2. The left door 26 includes an opening 40 through which material can be received from the discharge chute 16.

The framework 30 includes a front handle 42 which is integrally formed into it. The front and rear handles 42 and 20 support the bagger 10 on the lawn mower 12 and provide ready handgrips for the operator to remove the bagger 10 from the lawn mower 12 and carry it to a separate location for disposal of the clippings.

Figure 5:
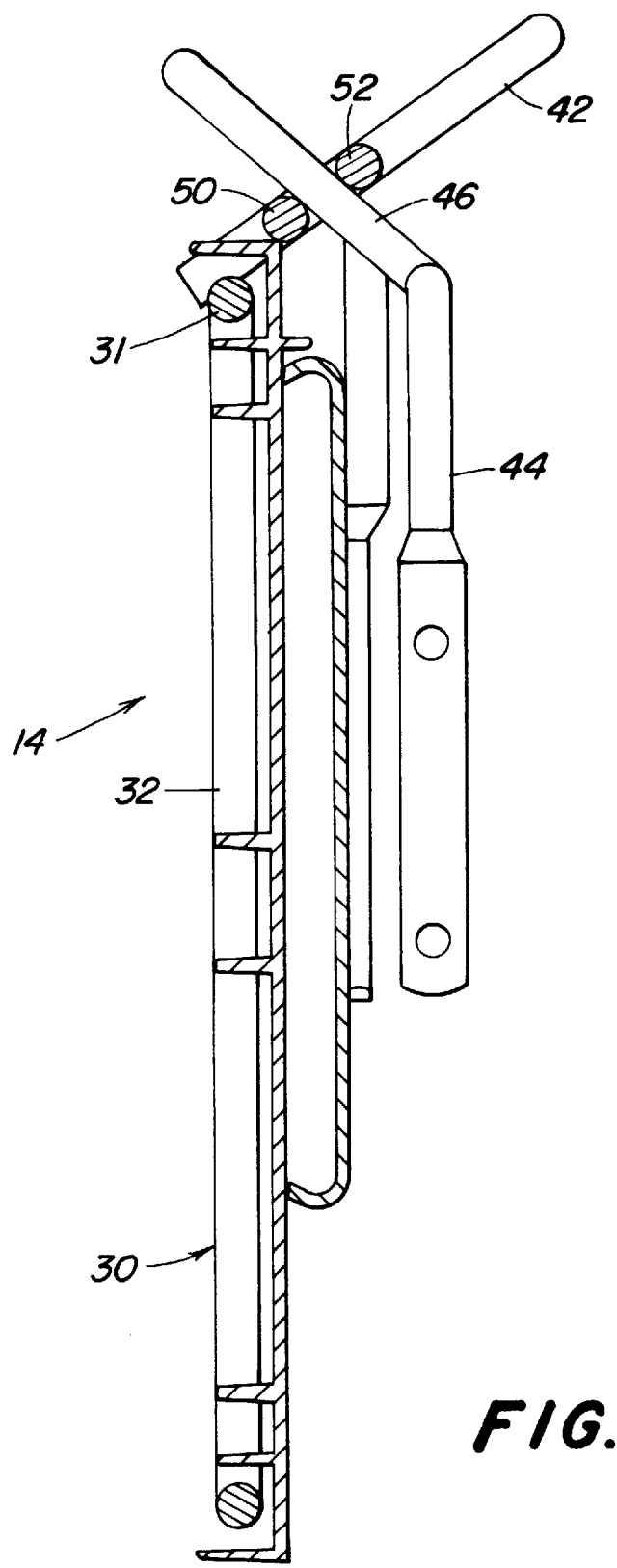
FIG. 5 is a sectional side view illustrating the door assembly and framework when mounted to the discharge chute.
Figure 6:
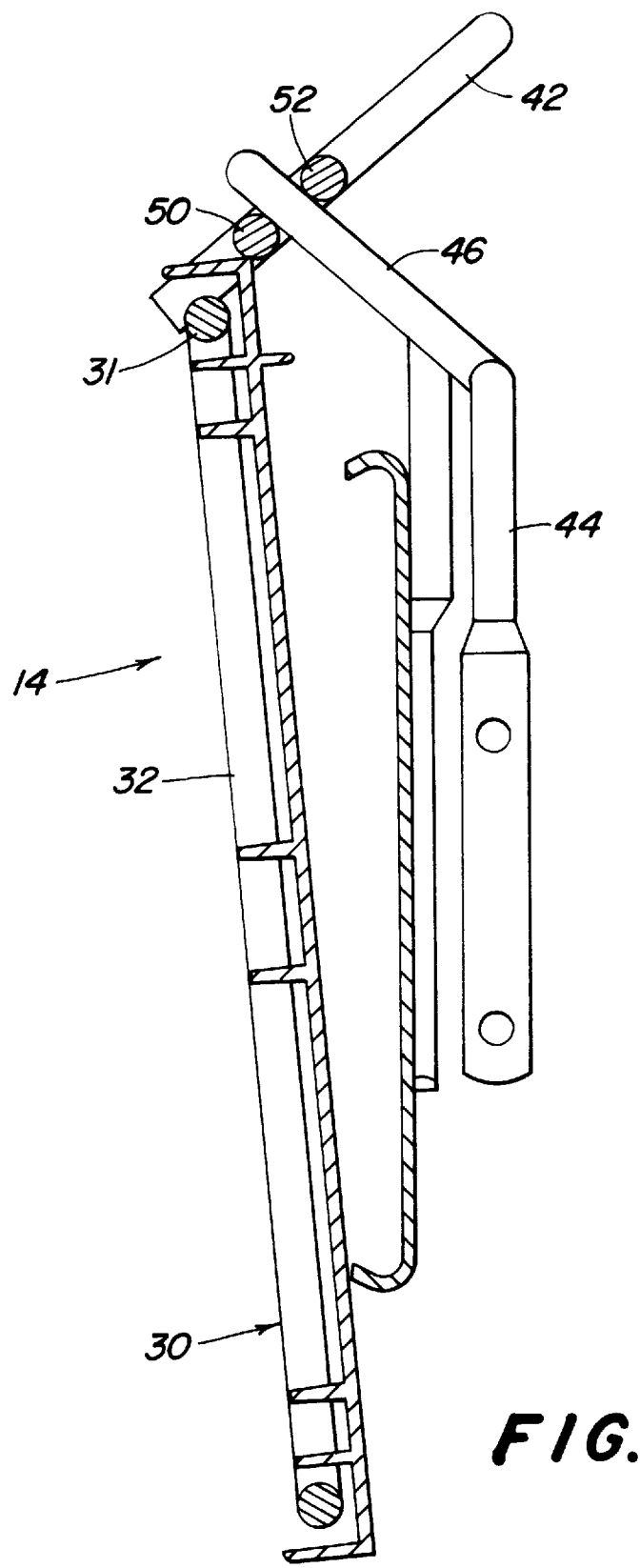
FIG. 6 is a sectional view illustrating the door partially removed from the discharge chute hook.

Looking now to FIGS. 4, 5, and 6, the framework 30 with its handle 42 and the chute rod 44 and support hook 46 are illustrated. The handle 42 includes two slotted areas 48 formed to fit around and slide along the hooked portion 46 of the rod 44 secured to the chute 16. As can be seen in FIGS. 5 and 6, the hook 46 projects upwardly and rearwardly.

In operation, the bagger 10 would be mounted to the mower 12 as illustrated in FIG. 1. The rear handle 20 would be carried on the push handle 22 while the front handle 42 would carried on the hook 46 to support the bagger 10 at the rear of the discharge chute 16, allowing material propelled through the chute 16 to pass through the opening 40 in the left door 26 and into the bag 18. When the bag 18 has been sufficiently filled and the operator wants to empty the bag 18, he would grasp the first and second handles 20 and 42, see FIG. 2, to remove bag 18 from the mower 12. He would first raise the rear handle 20 so that the front handle 42 could be slidably moved from the position illustrated in FIG. 5 to the position illustrated in FIG. 6. Since the bars 50 and 52 which form the sides of the slots are canted relative to the hook 46, the front handle 42 can be slidably moved upwardly along the hook 46 to remove the front handle 42 from the hook 46 and the bagger 10 from the mower 12. With the doors 26 and 28 in their closed position, as illustrated in FIG. 2, the bagger assembly 10 could be transported to a location where the material could be emptied from the bag 18.

To empty the bag 18, the operator would keep the doors 26 and 28 in their closed position and insert that end of the bagger 10 into the refuse can or bag. As the rear of the bagger 10 is raised, the doors 26 and 28 could open, permitting the material to fall through the opening 24 and into the refuse bag. Since the doors 26 and 28 are small, approximately one half the size of the opening 24, and pivot about their laterally spaced-apart sides at the legs 32, they allow the end of the bagger 10 to be inserted into most refuse cans and bags while they are closed or open. Further, they will not substantially impede the discharge of clippings through the opening 24 of the bag 18.

I claim:

1. A bagging assembly usable with a walk-behind lawn mower, the lawn mower having a chute with an opening through which clippings can be discharged, the assembly including a bag with an opening for receiving clippings from the chute, and a generally rigid framework attached to the bag and surrounding the opening, the framework including a cross member with laterally spaced apart and generally vertically extending legs operatively connected thereto;

a pair of doors, one door being attached to each vertical leg for swinging movement about an axis extending through said leg, one door having an opening for receiving material propelled through the chute; and means for releasably securing the framework of the bag with the chute.

2. The invention defined in claim 1 wherein the framework is generally rectangular and includes two spaced apart generally vertical metal legs with one door being removably mounted on each leg for swinging movement.

3. The invention defined in claim 1 wherein the doors are made of composite material.

4. The invention defined in claim 3 wherein each door includes means permitting it to be slidably snapped onto one leg.

5. The invention defined in claim 1 wherein each door includes a vertical edge, said doors being swingably movable between first closed positions where their respective vertical edges are adjacent and second open positions where their vertical edges are laterally spaced apart.

6. The invention defined in claim 1 wherein the mower includes a push handle and the bag assembly includes a hanger which can be removably attached to the handle.

7. The invention defined in claim 1 wherein the framework includes an upwardly and forwardly extending handle, the chute includes an upwardly and rearwardly extending hook and the handle is adapted to be removably supported on the hook.

8. The invention defined in claim 7 wherein the handle includes at least one slot through which the hook can be slidably received.

9. The invention defined in claim 1 wherein each door is substantially smaller than the opening in the bag.

\* \* \* \* \*